(12) United States Patent
Moride et al.

(10) Patent No.: US 10,069,389 B2
(45) Date of Patent: Sep. 4, 2018

(54) STATOR AND METHOD OF SEALING STATOR WITH RESIN

(71) Applicant: TOYOTA JIDOSHA KABUSHIKI KAISHA, Tokyo (JP)

(72) Inventors: Kenshiro Moride, Nagoya (JP); Masashige Tanaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 380 days.

(21) Appl. No.: 15/054,790

(22) Filed: Feb. 26, 2016

(65) Prior Publication Data

US 2016/0276911 A1   Sep. 22, 2016

(30) Foreign Application Priority Data

Mar. 17, 2015   (JP) ................. 2015-053620

(51) Int. Cl.
*H02K 1/04* (2006.01)
*H02K 15/12* (2006.01)
(Continued)

(52) U.S. Cl.
CPC ....... *H02K 15/12* (2013.01); *B29C 45/14467* (2013.01); *B29C 45/14639* (2013.01);
(Continued)

(58) Field of Classification Search
CPC ...... H02K 5/08; H02K 5/225; H02K 2203/12; H02K 3/38; H02K 3/345; H02K 5/10
(Continued)

(56) References Cited

U.S. PATENT DOCUMENTS 7,456,533 B2 * 11/2008 Nanbu ............... H02K 11/40
310/216.137
9,787,166 B2 * 10/2017 Kino ................. H02K 15/12
(Continued)

FOREIGN PATENT DOCUMENTS

JP   S60-210142 A   10/1985
JP   4-15854 U    2/1992
(Continued)

OTHER PUBLICATIONS

Japanese Office Action dated Mar. 21, 2017 in Patent Application No. 2015-053620 (submitting English translation only).

*Primary Examiner* — Thanh Lam
(74) *Attorney, Agent, or Firm* — Oblon, McClelland, Maier & Neustadt, L.L.P.

(57) ABSTRACT

At the time of molding, in the stator, the resin material flows inside the vent channels that are formed on the terminal block. At this time, as the resin reservoirs which are formed by expanding cross-sections of the vent channels are provided on the mounting surface of the terminal block, the resin material can be retained in the resin reservoirs. This consequently prevents the resin material from flowing through the vent channels to the outside of the terminal block. When the resin leaked part, which is the resin material that has leaked from the vent channels to the outside and been hardened, falls while using the motor, there is an adverse effect on another piece of equipment. Thus, the resin reservoirs that are formed in the vent channels act effectively in terms of preventing the resin material from flowing to the outside.

7 Claims, 7 Drawing Sheets

(51) Int. Cl.
  *B29C 45/14* (2006.01)
  *B29C 45/34* (2006.01)
  *H02K 3/38* (2006.01)
  *H02K 5/22* (2006.01)
  *H02K 5/08* (2006.01)
  *B29K 105/12* (2006.01)

(52) U.S. Cl.
  CPC ............... *B29C 45/34* (2013.01); *H02K 3/38* (2013.01); *H02K 5/08* (2013.01); *H02K 5/225* (2013.01); *B29K 2105/12* (2013.01)

(58) Field of Classification Search
  USPC ................. 310/43, 52–59, 216.001–216.137
  See application file for complete search history.

(56) References Cited

U.S. PATENT DOCUMENTS

| | | | |
|---|---|---|---|
| 2002/0195885 A1* | 12/2002 | Tsuneyoshi | H02K 1/185 310/43 |
| 2012/0018927 A1* | 1/2012 | Watanabe | B29C 45/2669 264/500 |
| 2013/0187488 A1* | 7/2013 | Sakamoto | H02K 1/06 310/44 |
| 2016/0056694 A1* | 2/2016 | Mabu | H02K 15/12 29/598 |
| 2016/0183405 A1 | 6/2016 | Sanada et al. | |

FOREIGN PATENT DOCUMENTS

| | | | |
|---|---|---|---|
| JP | 2012-186891 A | 9/2012 | |
| JP | 2013-49253 | 3/2013 | |
| JP | 2015-9466 A | 1/2015 | |

\* cited by examiner

STATOR AND METHOD OF SEALING STATOR WITH RESIN

INCORPORATION BY REFERENCE

This application is based upon and claims the benefit of priority from Japanese patent application No. 2015-053620, filed on Mar. 17, 2015, the disclosure of which is incorporated herein in its entirety by reference.

BACKGROUND OF THE INVENTION

1. Field of the Invention

The present invention relates to a stator in which a coil mounted on a stator core is sealed with a resin material and the stator is disposed in such a way that a terminal block is brought into contact with a peripheral surface of the stator core, and a method of sealing the stator with resin.

2. Description of Related Art

In general, when a stator on which a coil is mounted is sealed with a resin material, a mold including a cavity which will be filled with resin is used. In order to prevent a generation of an air pocket in a product which will be molded, it is necessary to effectively discharge air inside a cavity. Japanese Unexamined Patent Application Publication No. 2013-49253 discloses such a mold.

The mold disclosed in Japanese Unexamined Patent Application Publication No. 2013-49253 is a mold for manufacturing electronic parts and can be applied to manufacture of motors. Further, an air vent for efficiently discharging the air inside the cavity to outside is formed in the mold. An opening and closing of the air vent is controlled so that the resin material that is injected into the cavity will not flow through the air vent to the outside.

When the air inside the cavity is discharged using such a mold, it is necessary to control the opening and closing of the air vent provided on the mold so that the resin material will not flow through the air vent to the outside. This consequently leads to a problem of complicating a structure of the mold.

An object of the present invention is to provide a stator that prevents a resin material from flowing through a vent channel to outside of the terminal block without complicating a structure of a mold and a method of sealing the stator with resin.

SUMMARY OF THE INVENTION

An aspect of the present invention is a stator including: a coil mounted on a stator core and sealed with a resin material; and a terminal block that is disposed to be in contact with a peripheral surface of the stator core.

The terminal block comprises a mounting surface to be in contact with the stator core, and the mounting surface includes:

a vent channel that extends from inside to outside of the stator core; and a resin reservoir that is formed by partially expanding a cross-section of the vent channel.

In this stator, the resin material flows through the vent channel formed on the terminal block at the time of molding. At that time, a resin reservoir that is formed by partially expanding a cross-section of the vent channel is formed on the mounting surface of the terminal block. Thus, the resin material in the vent channel retains in the resin reservoir. This consequently prevents the resin material from flowing through the vent channel to outside of the terminal block.

When a resin leaked part, which is the resin material that has leaked from the vent channel to the outside and been hardened, falls while using the motor, there is an adverse effect on another piece of equipment. Thus, the resin reservoir that is formed at a part of the vent channel acts effectively in terms of preventing the resin material from flowing to the outside. As a result, the stator can prevent the resin material from flowing without requiring an addition of a complicated configuration such as an opening and closing mechanism. Additionally, the stator can be manufactured without complicating a mold structure.

Further, the resin reservoir expands in a direction of a channel width of the vent channel.

With such a configuration, it is possible to reliably capture the resin material in the resin reservoir at the time of manufacturing the stator.

Furthermore, the resin material contains glass fibers, and the resin reservoir expands in a direction of a channel depth of the vent channel.

The glass fibers are used for the resin material which is used to mold the coil. When resin leaks from an exit of the vent channel for some reason, the resin material that leaked and is hardened at the exit of the vent channel contains the glass fiber. When the resin leaked part falls and adheres to another piece of equipment, the glass fibers may cause a failure in the equipment. Accordingly, even when the resin leak part is formed at the exit of the vent channel, it is preferable that the glass fibers are not contained in the resin leaked part. Thus, the resin reservoir is expanded upward in the direction of the channel depth of the vent channel. It is thus possible to reliably cause the Barus effect to occur inside the vent channel and change the orientation of the glass fibers to upward in the resin reservoir. Consequently, even when the resin leaked part is formed at the exit of the vent channel, it will be hard for the glass fibers to be contained in the resin leaked part.

In addition, a width of the resin reservoir is greater than the channel width of the vent channel.

By doing so, it is possible to reliably capture the resin material in the resin reservoir.

The vent channel is comprised of a first vent part that is positioned inward from the resin reservoir and a second vent part that is positioned outward from the resin reservoir, and the second vent part is dislocated laterally from a line along which the first vent part is extended.

Such a configuration can make it difficult for the resin material flowing through the vent channel to flow from the first vent part to the second vent part. This consequently makes it easy for the resin material to be retained in the resin reservoir, thereby reliably preventing the resin from leaking from the vent channel.

Moreover, a plurality of the vent channels communicate with the resin reservoir.

Another aspect of the present invention is a method of sealing a stator with resin including steps of:

a stator core setting that includes placing a coil in a cavity of a mold and exposing a terminal block from the mold while the terminal block is brought into contact with an end surface of a stator core;

an injection that includes injecting a resin material into the cavity and sealing the coil with the resin material; and a discharge that includes discharging remaining air inside the cavity from a vent channel that is formed on the terminal block to outside, wherein the terminal block comprises a mounting surface which will be in contact with the stator core, and the vent channel that extends from inside to outside of the stator core and a resin reservoir that is formed by partially expanding a cross-section of the vent channel are formed on the mounting surface, and the resin material flowing into the vent channel is retained inside the resin reservoir during the step of the discharge.

The present invention can prevent the resin material from flowing through the vent channel to the outside of the terminal block without complicating a structure of the mold.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, a preferred embodiment of a stator and a method of sealing the stator with resin according to the present invention shall be explained in detail with reference to the drawings.

Figure 1:
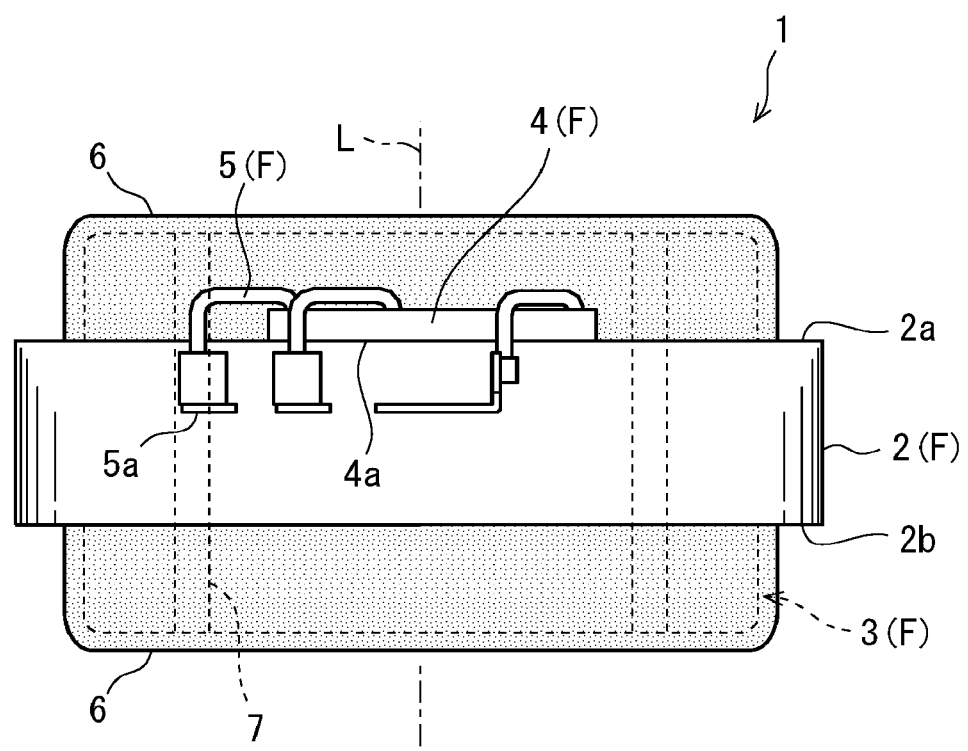
FIG. 1 is a front view showing an embodiment of a stator according to the present invention.

A stator for electric motor 1 shown in FIG. 1 is used for a motor and a generator for driving a hybrid vehicle. Note that the stator for electric motor 1 is not only used for hybrid vehicles but also used for electric vehicles and fuel cell vehicles.

A stator body F of the stator 1 is comprised of an annular stator core 2, a coil 3 that is mounted on a teeth part disposed to project from an inner peripheral side of the stator core 2 toward a radial direction and disposed at equal intervals in a circumferential direction, a terminal block 4 that is disposed to be in contact with a peripheral surface of the stator core 2, and a terminal 5 that projects from the terminal block 4. The coil 3 is covered by a resin mold part 6. By the resin mold part 6, the coil 3 is sealed with a resin material 30 (e.g. thermosetting unsaturated polyester resin) and fixed to the stator core 2. A hollow part 7 for accommodating a rotor is formed in the stator 1. The hollow part 7 penetrates through the stator 1 in a rotational axis L direction.

The terminal block 4 is brought into contact with an annular flat end surface 2a of the stator core 2. A mounting surface 4a that is brought into contact with the end surface 2a of the stator core 2 is provided on the terminal block 4. The terminal block 4 extends along the circumferential direction of the stator core 2. Three terminals 5 extend from the terminal block 4. A round terminal 5a is formed at a tip of the terminal 5.

Figure 2:
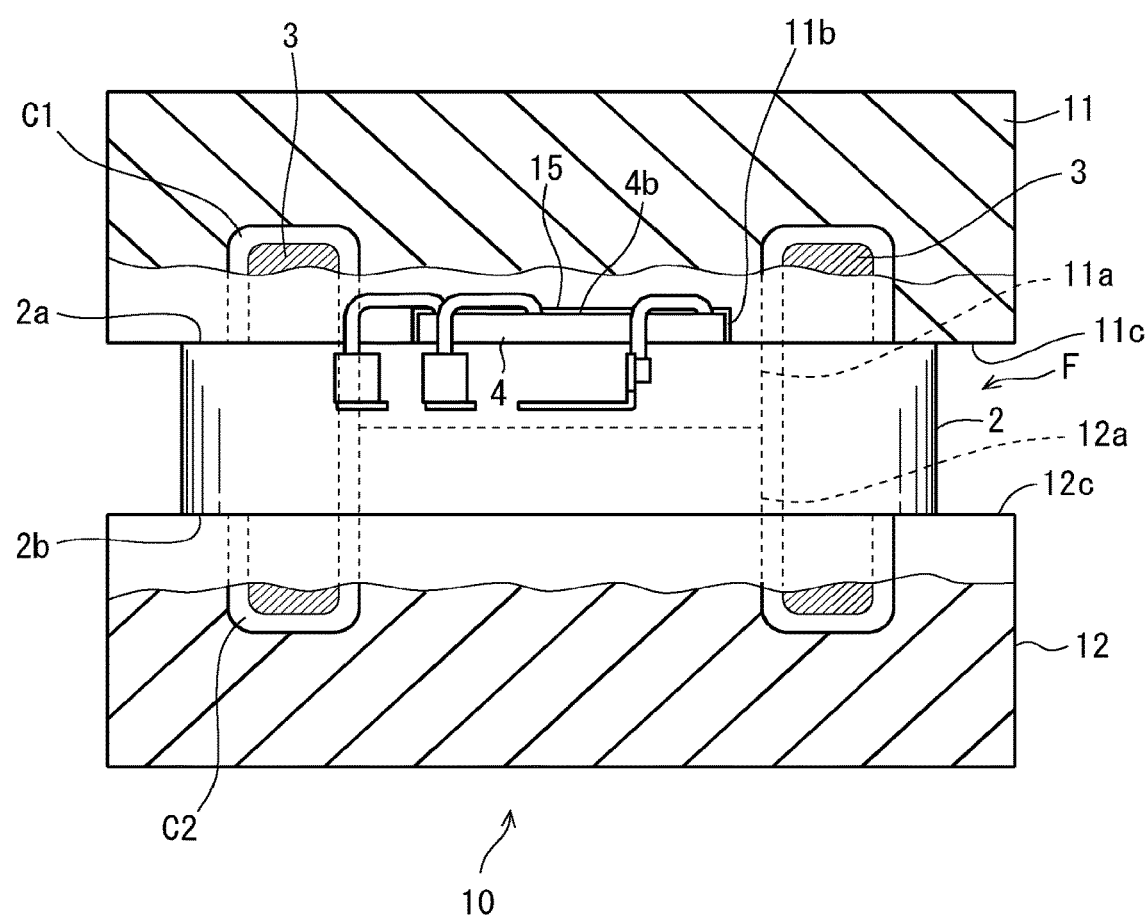
FIG. 2 is a cross-sectional diagram showing a mold for resin sealing which is used to mold a stator.

As shown in FIG. 2, when the resin mold part 6 is molded for the stator 1 having the above-mentioned configuration, a mold 10 for resin sealing is used. The mold 10 for resin sealing includes an ascendable and descendible upper mold 11 and a lower mold 12 that is placed on a fixed base. A contacting surface 11c of the upper mold 11 is brought into contact with one annular flat end surface 2a of the stator core 2. A contacting surface 12c of the lower mold 12 is brought into contact with the other annular flat end surface 2b of the stator core 2.

The upper mold 11 includes a first core 11a for forming an upper half of the hollow part 7 of the stator 1. The lower mold 12 includes a second core 12a for forming a lower half of the hollow part 7 of the stator 1. A lower end surface of the first core 11a and an upper end surface of the second core 12a can be in contact with each other. A toroidal first cavity C1 is formed inside the upper mold 11. A toroidal second cavity C2 is formed inside the lower mold 12.

Further, a notch 11b into which the terminal block 4 will be inserted is formed on the contacting surface 11c of the upper mold 11. A wall surface on which the notch 11b is formed is crimped to a peripheral surface 4b of the terminal block 4 with a seal material 15 interposed therebetween. The mounting surface 4a of the terminal block 4 is crimped to the upper end surface 2a of the stator core 2.

The notch 11b of the upper mold 11 is formed to avoid the terminal block 4. The wall surface on which the notch 11b is formed and an outer wall surface of the terminal block 4 are sealed. The terminal block 4 is exposed to the outside from the upper mold 11 by the notch 11b. Accordingly, the entire terminal block 4 will not be covered by the resin material 30 for sealing the coil 3.

When the mold 10 with the above-mentioned structure is used, the upper mold 11 is lifted so as to open the mold. After the mold is opened, the coil 3 of the stator body F is inserted into the second cavity C2 of the lower mold 12. At this time, the lower end surface 2b of the stator core 2 is brought into contact with the contacting surface 12c of the lower mold 12. After that, the upper mold 11 is lowered so as to insert the coil 3 of the stator body F into the first cavity C1 of the upper mold 11. Next, the contacting surface 11c of the upper mold 11 is brought into contact with the upper end surface 2a of the stator core 2. At this time, the terminal block 4 is inserted into the notch 11b of the upper mold 11. After that, the mold is clamped, and the first cavity C1 and the second cavity C2 are filled with the resin material 30. The coil 3 is covered by the resin mold part 6 (see FIG. 1).

When the first cavity C1 and the second cavity C2 are filled with the resin material 30, air inside the cavities C1 and C2 needs to be discharged to the outside. The air inside the cavities C1 and C2 is gradually discharged to the outside from a gap between the contacting surface 11c of the upper mold 11 and the end surface 2a of the stator core 2 and a gap between the contacting surface 12c of the lower mold 12 and the end surface 2b of the stator core 2. However, the seal material 15 is applied on the peripheral surface 4b of the terminal block 4. Therefore, the air inside the cavities C1 and C2 could be trapped by the terminal block 4, thereby generating an air pocket along a back surface 4c of the terminal block 4.

Figure 3:
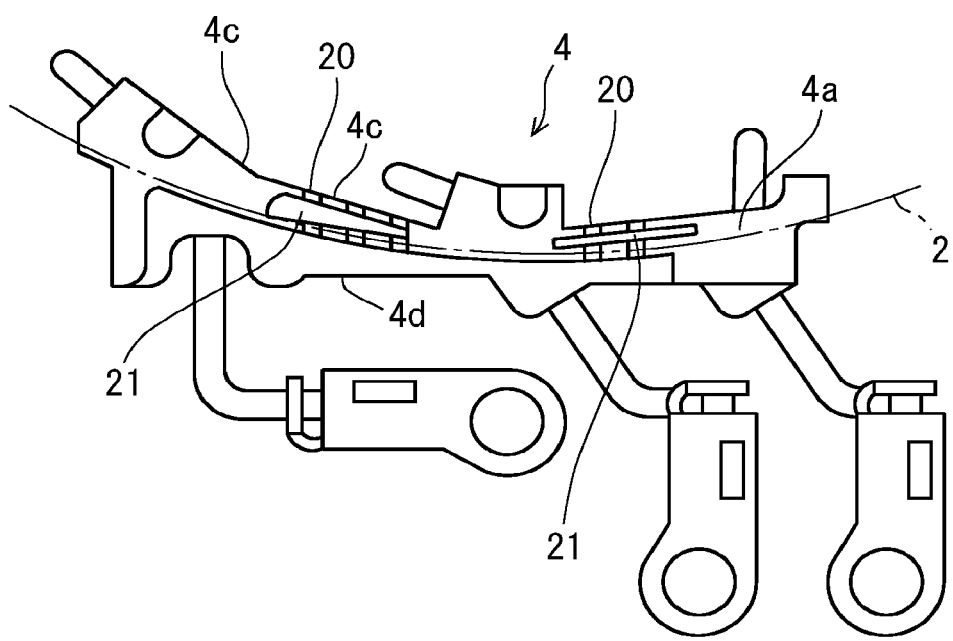
FIG. 3 is a bottom view of a terminal block viewed from a mounting surface.
Figure 4:
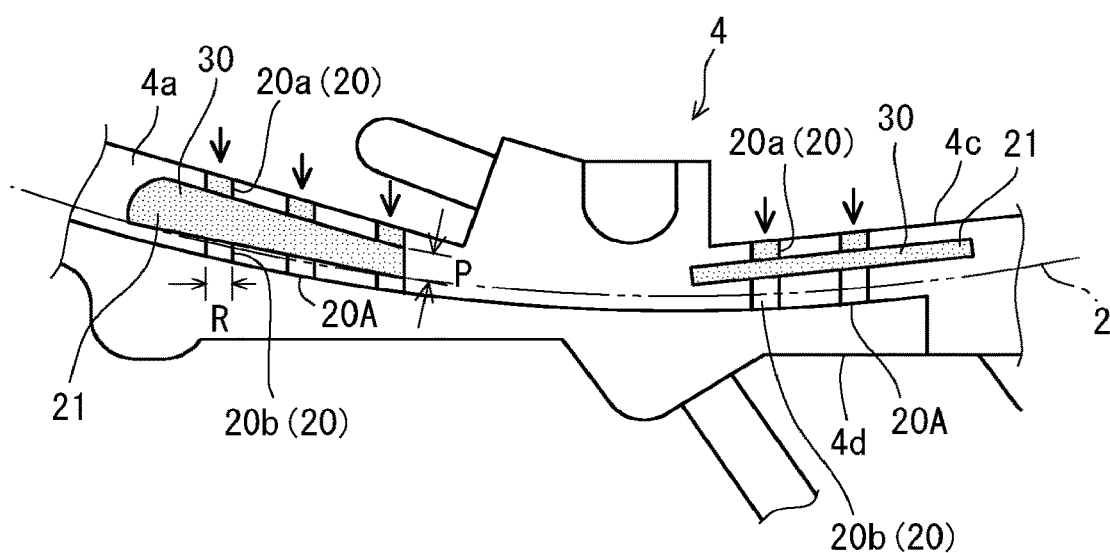
FIG. 4 is an enlarged diagram of FIG. 3.

Thus, as shown in FIGS. 3 and 4, vent channels 20 for air venting are formed on the mounting surface 4a of the terminal block 4. The vent channels 20 are formed to extend from inside to outside of the stator core 2, and specifically, from the back surface 4c to a front surface 4d of the terminal block 4. Resin reservoirs 21 which are formed by expanding a cross-section of the vent channels 20 are provided at a part of the vent channels 20. A plurality of (e.g. two or three) the vent channels 20 communicate with the resin reservoirs 21.

The vent channel 20 is comprised of a first vent part 20a that is positioned inward from the resin reservoir 21 and a second vent part 20b that is positioned outward from the resin reservoir 21. The first vent part 20a and the second vent part 20b are aligned on a straight line. The resin reservoirs 21 are expanded in a direction of a channel width R across the plurality of vent channels 20. With such a configuration, the resin material 30 can be reliably captured in the resin reservoir 21. On the mounting surface 4a, the vent channel 20 that is positioned on the right side of FIG. 4 extends in such a way that the width thereof remains constant, while the vent channel 20 that is positioned on the left side of FIG. 4 extends in such a way that the width of the vent channel 20 gradually increases outwardly (the width of the vent channel 20 increases toward the left side of FIG. 4). Further, a width P of the resin reservoir 21 is formed so that the width P will be greater than the channel width R of the vent channel 20. By doing so, the resin material 30 can be reliably captured in the resin reservoir 21.

Figure 5:
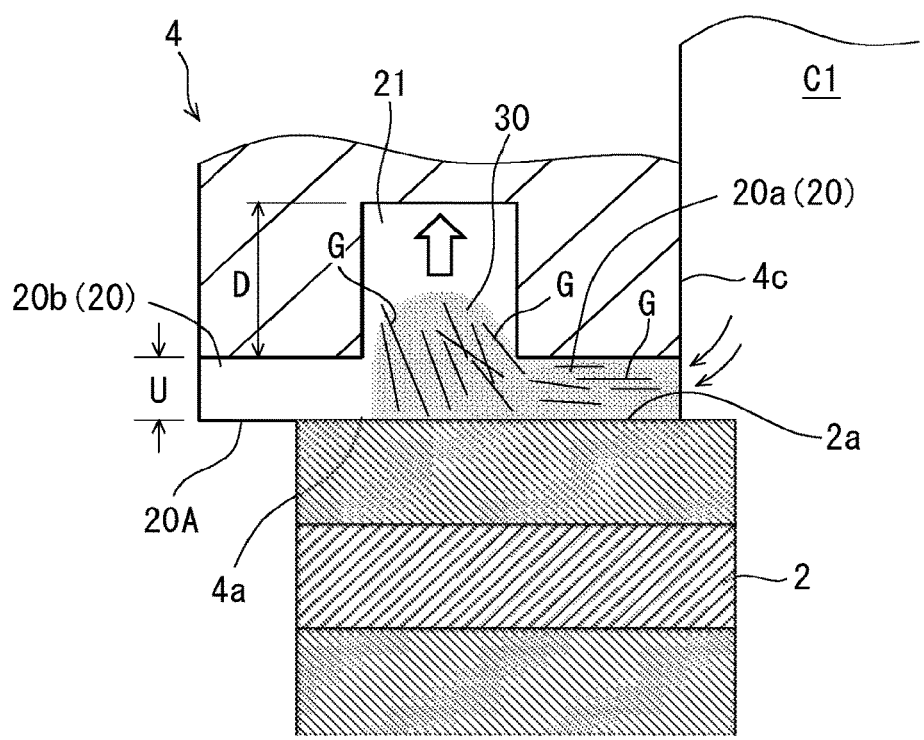
FIG. 5 is a cross-sectional diagram showing an enlarged vent channel.

Additionally, as shown in FIG. 5, the resin reservoir 21 is expanded upward in a direction of a channel depth U of the vent channel 20. Note that a depth D of the resin reservoir 21 that is positioned on the right side of FIG. 4 may be the same as the depth D of the resin reservoir 21 that is positioned on the left side of FIG. 4 or they may be different from each other.

The resin material 30 that is injected into the first cavity C1 and the second cavity C2 contains glass fibers G. The glass fibers G are used for the resin material 30 which is used to mold the coil 3. When resin leaks from an exit 20A of the vent channel 20 for some reason, the resin material 30 that leaked and is hardened at the exit 20A of the vent channel 20 contains the glass fiber G. When the resin leaked part falls and adheres to another piece of equipment at the time of using a motor, the glass fibers G may cause a failure in the equipment. Accordingly, even when the resin leak part is formed at the exit 20A of the vent channel 20, it is preferable that the glass fibers G not be contained in the resin leaked part.

Thus, the resin reservoir 21 is expanded upward in the direction of the channel depth U (a direction in which the rotational axis L extends) of the vent channel 20. It is thus possible to reliably cause the Barus effect to occur inside the vent channel 20 and change the orientation of the glass fibers G to upward in the resin reservoir 21. This enables the resin reservoir 21 to reliably capture the glass fibers G and confine the glass fibers G inside the resin reservoir 21. Consequently, even when the resin leaked part is formed at the exit 20A of the vent channel 20, it will be difficult for the glass fibers G to be contained in the resin leaked part.

As to the vent channel 20, the above-mentioned channel width R is about 1 mm, and the above-mentioned channel depth U is about 0.1 to 0.3 mm. A depth of the resin reservoir 21 is about 0.5 to 2 mm. These values can be changed as appropriate.

At the time of molding, in the stator 1, the resin material 30 flows inside the vent channels 20 that are formed on the terminal block 4. At this time, as the resin reservoirs 21 which are formed by partially expanding the cross-sections of the vent channels 20 are provided on the mounting surface 4a of the terminal block 4, the resin material 30 can be retained in the resin reservoirs 21. This consequently prevents the resin material 30 from flowing through the vent channels 20 to the outside of the terminal block 4. When the resin leaked part, which is the resin material 30 that has leaked from the vent channels 20 to the outside and been hardened, falls while using the motor, there is an adverse effect on another piece of equipment. Thus, the resin reservoirs 21 that are formed at a part of the vent channels 20 act effectively in terms of preventing the resin material 30 from flowing to the outside.

Next, a method of sealing the stator 1 with resin shall be briefly explained.

Figure 6:
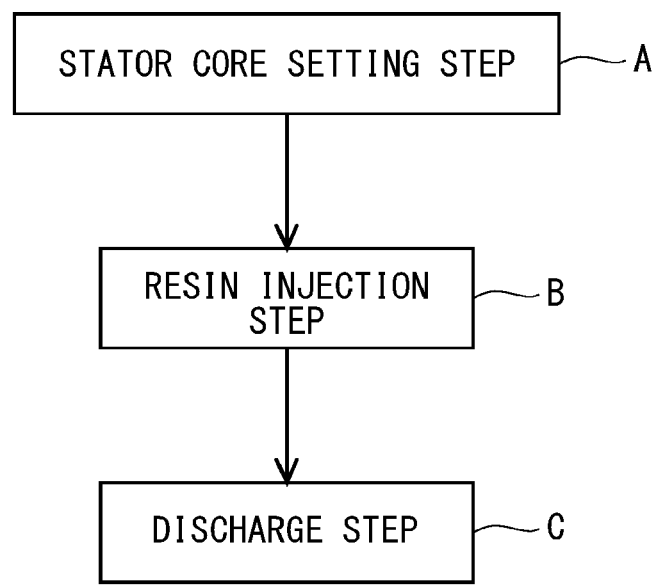
FIG. 6 is a block diagram showing a method of sealing the stator with resin.

A "stator core setting step" that is indicated by a code A in FIG. 6 shall be explained as follows. Firstly, the coil 3 is placed inside the second cavity C2 of the lower mold 12. At this time, the end surface 2b of the stator core 2 is brought into contact with the contacting surface 12c of the lower mold 12. After this, the mold 10 is clamped. At this time, the terminal block 4 is exposed from the mold 10.

A "resin injection step" that is indicated by a code B in FIG. 6 shall be explained as follows. The resin material 30 is injected into the first cavity C1 and the second cavity C2, and the coil 3 is sealed with the resin material 30.

A "discharge step" that is indicated by a code C in FIG. 6 shall be explained as follows. Remaining air inside the first cavity C1 and the second cavity C2 is discharged from the exit 20A of the vent channels 20 to the outside. At this time, the resin material 30 that has flown into the vent channels 20 is retained in the resin reservoirs 21.

After the resin material 30 is completely injected into the first cavity C1 and the second cavity C2, the mold 10 is cooled, and then the mold 10 is opened to remove the stator core 2.

The present invention is not limited to the above-described embodiment, and various modifications as explained below can be made without departing from the scope of the invention.

Figure 7A:
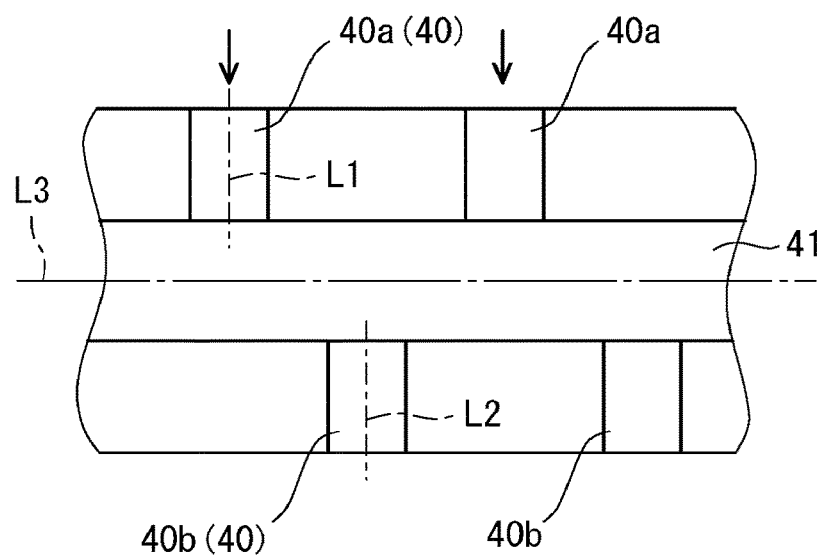
FIG. 7A is an enlarged bottom view of a relevant part showing a modified example of the vent channel.

As shown in FIG. 7A, a vent channel 40 is comprised of a first vent part 40a that is positioned inward from a resin reservoir 41 and a second vent part 40b that is positioned outward from the resin reservoir 41. The second vent part 40b and the first vent part 40a are dislocated laterally along a reference axis (an axis along the direction in which the resin reservoir 41 is extended) L3 of the resin reservoir 41. The first vent part 40a and the second vent part 40b are orthogonal to each other with respect to the reference axis L of the resin reservoir 41. A channel axis L1 of the first vent part 40a and a channel axis L2 of the second vent part 40b extend in parallel to each other. The vent channel 40 with the above-mentioned structure can make it difficult for the resin material 30 flowing through the vent channel 40 to flow from the first vent part 40a to the second vent part 40b. This consequently makes it easy for the resin material 30 to be retained in the resin reservoir 41, thereby reliably preventing the resin from leaking from the vent channel 40.

Figure 7B:
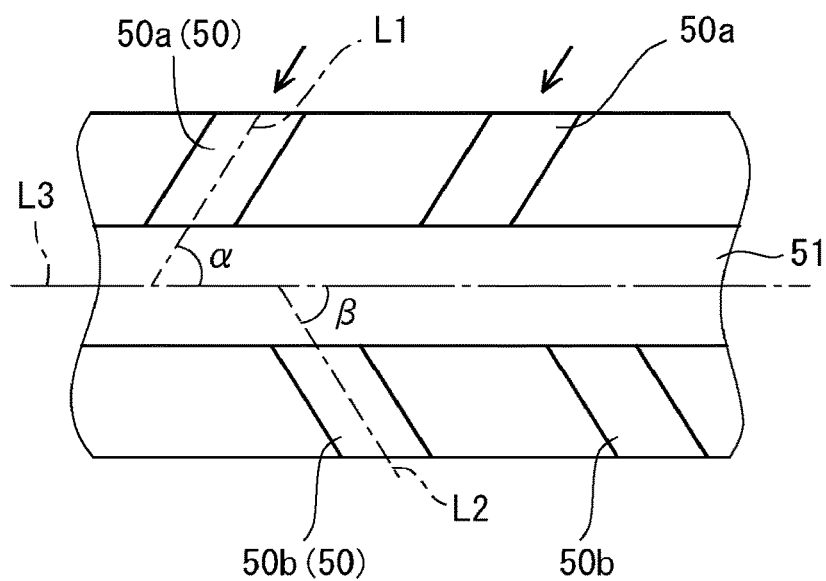
FIG. 7B is an enlarged bottom view of a relevant part showing a modified example of the vent channel.

As shown in FIG. 7B, a vent channel 50 is comprised of a first vent part 50a that is positioned inward from a resin reservoir 51 and a second vent part 50b that is positioned outward from the resin reservoir 51. The second vent part 50b and the first vent part 50a are dislocated laterally along the reference axis L3 of the resin reservoir 51. The first vent part 50a and the second vent part 50b respectively extend at angles α and β which are less than 90 degrees with respect to the reference axis L3 that extends along the resin reservoir 51. The channel axis L1 of the first vent part 50a and the channel axis L2 of the second vent part 50b form acute angles with the reference axis L3 of the resin reservoir 51. The vent channel 50 with the above-mentioned structure can make it difficult for the resin material 30 flowing through the vent channel 50 to flow from the first vent part 50a to the second vent part 50b. This consequently makes it easy for the resin material 30 to be retained in the resin reservoir 51, thereby reliably preventing the resin from leaking from the vent channel 50.

A positional relationship between the first vent part and the second vent part is not limited by the above, and various modifications can be made.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A stator comprising: a coil mounted on a stator core and sealed with a resin material; and a terminal block that is disposed to be in contact with a peripheral surface of the stator core, wherein
    the terminal block comprises a mounting surface in contact with the stator core,
    the mounting surface comprises:
        a vent channel that extends from inside to outside of the stator core; and
        a resin reservoir that is formed by partially expanding a cross-section of the vent channel, and
    the vent channel is comprised of a first vent part that is positioned inward from the resin reservoir and a second vent part that is positioned outward from the resin reservoir.

2. The stator according to claim 1, wherein
    the resin reservoir expands in a direction of a channel width of the vent channel.

3. The stator according to claim 1, wherein
    the resin material contains glass fibers, and
    the resin reservoir expands in a direction of a channel depth of the vent channel.

4. The stator according to claim 1, wherein
    a width of the resin reservoir is greater than the channel width of the vent channel.

5. The stator according to claim 1, wherein
    the second vent part is dislocated laterally from a line along which the first vent part is extended.

6. The stator according to claim 1, wherein
    a plurality of the vent channels communicate with the resin reservoir.

7. A method of sealing a stator with resin comprising steps of:
    a stator core setting that includes placing a coil in a cavity of a mold and exposing a terminal block from the mold while the terminal block is brought into contact with an end surface of a stator core;
    an injection that includes injecting a resin material into the cavity and sealing the coil with the resin material; and
    a discharge that includes discharging remaining air inside the cavity from a vent channel that is formed on the terminal block to outside, wherein
    the terminal block comprises a mounting surface in contact with the stator core, and
    the vent channel that extends from inside to outside of the stator core and a resin reservoir that is formed by partially expanding a cross-section of the vent channel are formed on the mounting surface,
    the vent channel is comprised of a first vent part that is positioned inward from the resin reservoir and a second vent part that is positioned outward from the resin reservoir, and
    the resin material flowing into the vent channel is retained inside the resin reservoir during the step of the discharge.

* * * * *